April 28, 1959  D. T. AYERS, JR  2,883,971
HYDRAULICALLY OPERATED BOOSTER BRAKE MECHANISM
Filed May 8, 1957  4 Sheets-Sheet 1

INVENTOR
DAVID T. AYERS, JR.
BY  John F. Philip
ATTORNEY

April 28, 1959 D. T. AYERS, JR 2,883,971
HYDRAULICALLY OPERATED BOOSTER BRAKE MECHANISM
Filed May 8, 1957 4 Sheets-Sheet 3

INVENTOR
DAVID T. AYERS, JR.

BY *John H. Phillips*
ATTORNEY

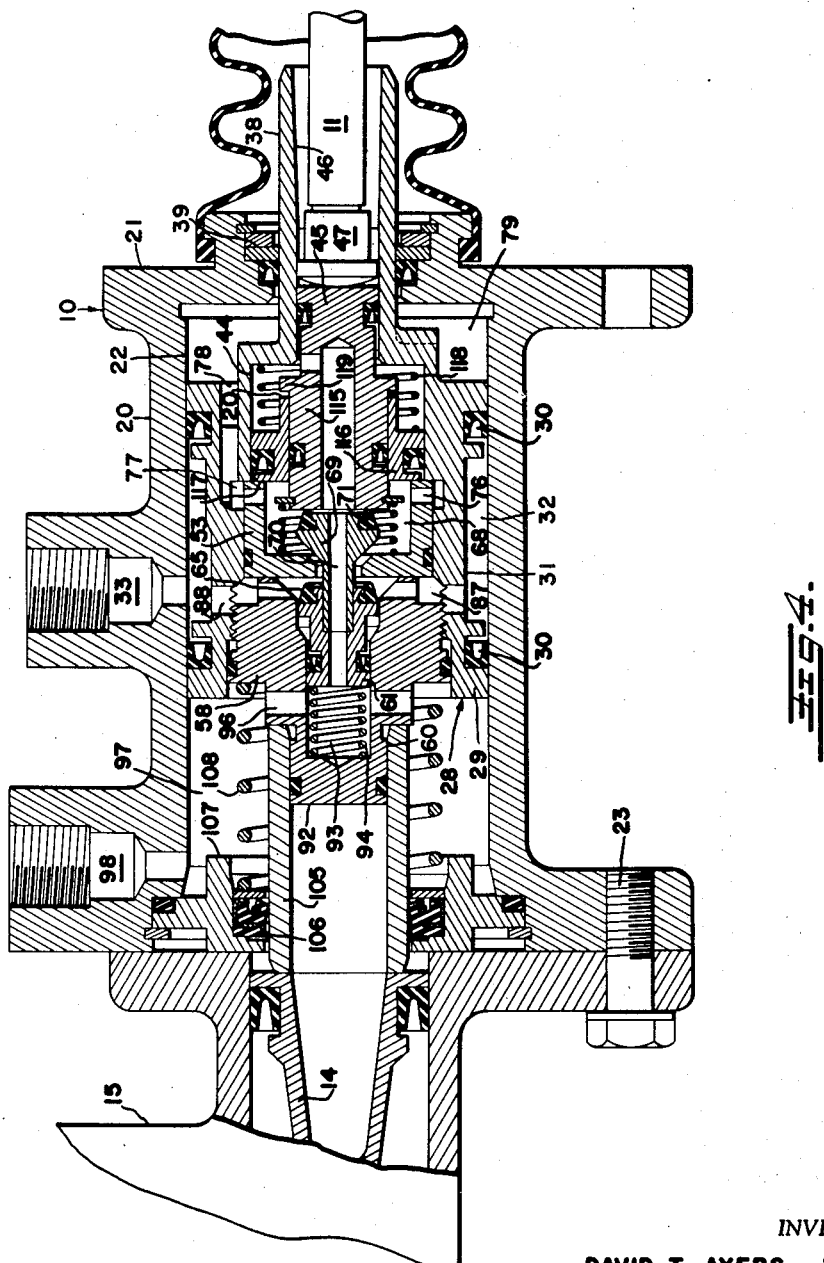

United States Patent Office 2,883,971
Patented Apr. 28, 1959

2,883,971

HYDRAULICALLY OPERATED BOOSTER BRAKE MECHANISM

David T. Ayers, Jr., Birmingham, Mich., assignor to Kelsey-Hayes Company, Detroit, Mich., a corporation of Delaware Application May 8, 1957, Serial No. 657,870

13 Claims. (Cl. 121—41)

This invention relates to a hydraulically operated booster brake mechanism and has particular reference to a system having a novel type of hydraulic motor operable from a source of static hydraulic pressure such as an accumulator.

This invention is an improvement over the structure shown in the copending application of William Stelzer, Serial No. 652,433, filed April 12, 1957.

An important object of the invention is to provide a hydraulic brake booster motor which operates on the same general principles as the motor of the copending application referred to and wherein the parts are so simplified as to permit a substantial reduction in the cost of manufacturing and assembling the device.

A further object is to provide such a mechanism wherein the use of a flexible hydraulic fluid return line from the motor is eliminated, the supplying of hydraulic pressure fluid and the relieving of such fluid from the motor taking place respectively through fixed ports formed in the housing of the apparatus.

A further object is to provide a simplified and economical form of poppet valving for the motor wherein a pair of poppet valves are employed, formed of rubber or other similar material.

A further object is to provide an apparatus of the character just referred to wherein the two rubber poppet valves employed project slightly from metallic valve-carrying elements which are adapted to take up thrusts through the valve mechanism without permitting distortion of the resilient valves.

A further object is to provide a motor of the type referred to wherein all forces transmitted to and through the motor are coaxial, thus providing for a perfect balancing of the forces with minimum friction and with no tendency for any of the parts to become misalined.

A further object is to provide such a mechanism which is particularly adapted for use in conjunction with a vehicle brake system and wherein the nature of the apparatus is such as to provide for the use of means effecting a single hydraulic reaction against the operation of the valve mechanism or a dual reaction means to effect a higher ratio of reaction in later stages of brake operation than in earlier stages and wherein either reaction means is housed wholly within the motor piston.

A further object is to provide a motor of the type referred to having poppet valving so formed that oppositely acting pressure forces transmitted to the valves are balanced to permit easy operation of the valves without the operator's having to overcome any pressures tending to hold the valves in any position.

Other objects and advantages of the invention will become apparent during the course of the following description.

In the drawings I have shown two embodiments of the invention. In this showing:

Figure 4 is a view similar to Figure 3 showing the parts in operative positions.

Figure 1:
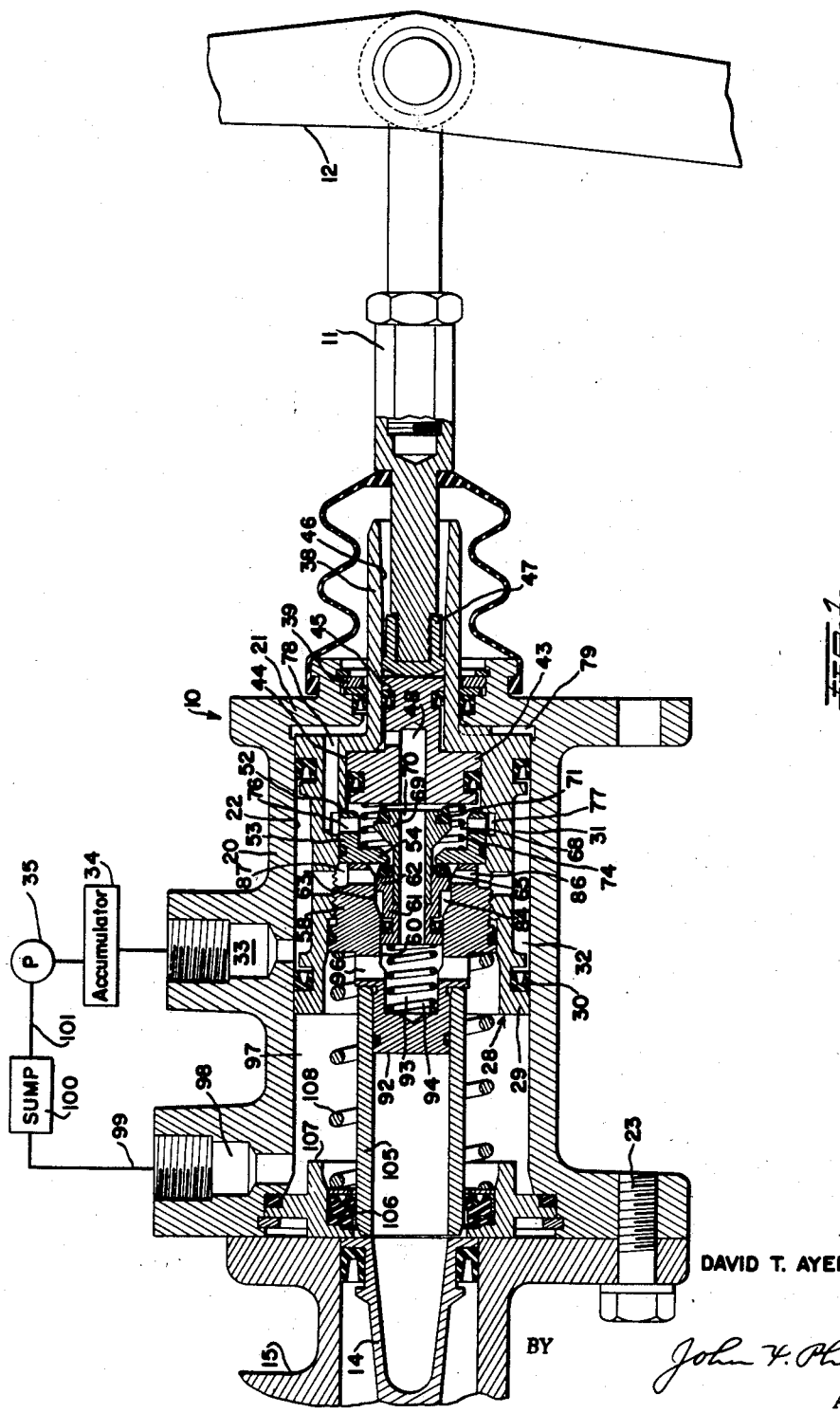
Figure 1 is an axial sectional view through the motor and associated elements, certain elements of the system being diagrammatically represented, the parts being shown in their normal off positions.
Figure 2:
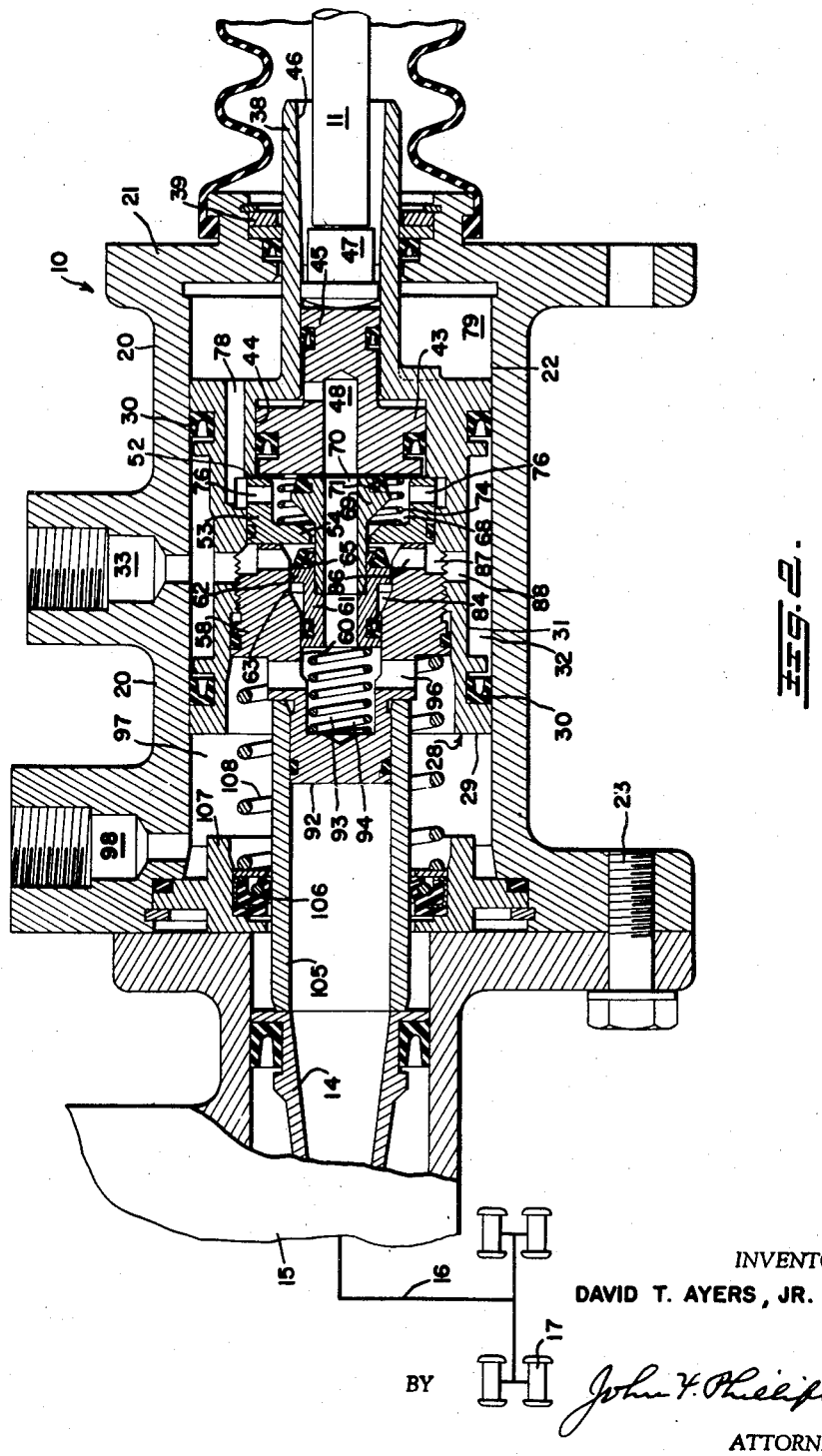
Figure 2 is a similar view showing the parts in operative positions and diagrammatically illustrating the connection of the master cylinder to the vehicle wheel cylinders.

Referring to Figures 1 and 2, the numeral 10 designates a hydraulic motor as a whole containing valve mechanism to be described. Such valve mechanism is operable by a push rod 11 connected as shown in Figure 1 to a conventional pedal 12 preferably of the depending type. Operation of the motor is adapted to actuate a plunger 14 arranged in a conventional master cylinder 15 and operative for displacing fluid through lines 16 (Figure 2) into the usual wheel cylinders 17.

The motor 10 comprises a preferably die-cast housing 20 having a head 21 at one end thereof forming a closure for the motor cylinder bore 22. The other end of the motor body is fixed as at 23 to the master cylinder 15 in axial alinement therewith.

A piston unit indicated as a whole by the numeral 28 is reciprocable in the bore 22. The piston unit comprises a body 29 having sealed engagement as at 30 with the bore 22 and, between the seals, the piston body is provided with an elongated annular groove 31 so that in any position of the piston, the chamber 32 formed by the groove 31 will communicate with an inlet port 33. This port is connected to an accumulator 34 in which static hydraulic pressure is maintained by a pump 35.

The piston body 29 is provided at the end opposite the master cylinder with an axially extending sleeve 38 extending through suitable sealing and bearing means 39 carried by the head 21. A valve operating and reaction member 43 is slidable in a bore 44 formed in the piston body 29. The member 43 has an axial projection 45 in sealed sliding engagement with an axial opening 46 formed in the sleeve 38.

The push rod 11 is provided on its left-hand end, as viewed in Figures 1 and 2, with an operating head or button 47 engageable with the adjacent end of the stem 45 to effect movement of the member 43 upon operation of the brake pedal 12. The member 43 is provided with a passage 48 affording communication between the interior of the axial opening 46 and with the space to the space to the left of the member 43 to supply hydraulic fluid to the axial opening 46 to maintain in moist condition the seal of the stem 45.

At a point spaced from its right-hand end in Figure 1, the bore 44 is enlarged to provide a shoulder 52 against which engages a valve seat element 53 having a radially inwardly extending portion 54 forming a valve seat as described below. A plug member 58 is threaded into the piston body 29 and engages against the member 53 to maintain it in position as shown in Figures 1 and 2.

The plug member 58 is provided with a bore 60 in which is slidable a valve body 61 having at its right-hand end a flange 62 slidable in an enlarged bore portion 63 formed in the plug member 58. Arranged against the flange 62 is a rubber or similar valve 65 projecting slightly beyond the right-hand limit of the valve body 61 and normally engaging the valve seat 54. The valve seat 54 forms a flange defining to the right thereof a chamber 68 in which is arranged a valve body 69 projecting axially into and carried by the valve body 61 and forming in effect a unit therewith, such unit having an axial passage 70 therethrough. This passage normally communicates with the chamber 68 around a normally open rubber or similar deformable valve 71 carried by the valve body 69 and engageable with the adjacent face of the member 43 when the valve mechanism is operated in the manner described below. A spring 74 is interposed between the valve seat 54 and member 43 to bias the latter to its right-hand limit of movement as shown in Figure 1.

The chamber 68 communicates through radial openings 76 with an annular chamber or groove 77 formed in the piston body 29 and communicating in turn through a longitudinal passage 78 with a pressure chamber 79 formed between the motor head 21 and the adjacent end of the piston body 29.

The flange 62 of the valve body 61 fits loosely in its bore 63 so that the spaces on opposite sides of this flange communicate with each other, and such spaces constitute a chamber 84 communicating through radial ports 86 with an annular space 87, and this space in turn communicates through radial ports 88 in the valve body 29, with the elongated annular space or chamber 32 which chamber, as stated above, communicates at all times with the inlet port 33.

At its left-hand end in Figures 1 and 2, the plug member 58 is provided with an axial projection 92 having a chamber 93 therein communicating with the adjacent end of the passage 70. A spring 94 is arranged in the chamber 93 and biases the valves 65 and 71 to their normal positions shown in Figure 1. The chamber 93 communicates through radial ports 96 with a motor chamber 97 in the left-hand end of the body 20. This chamber communicates through port 98 with a line 99 (Figure 1) leading to a sump 100 from which fluid is supplied through a line 101 to the pump 35.

A force-transmitting member 105, in the form of a tube, is fitted over the projection 92 and serves to transmit motor forces directly axially of the motor to the master cylinder piston 14. The member 105 slides through sealing means 106 carried by a ring 107 forming a closure for the chamber 97. A return spring 108 for the piston unit is interposed between the sealing means 106 and the enlarged portion of the plug member 58.

Figure 3:
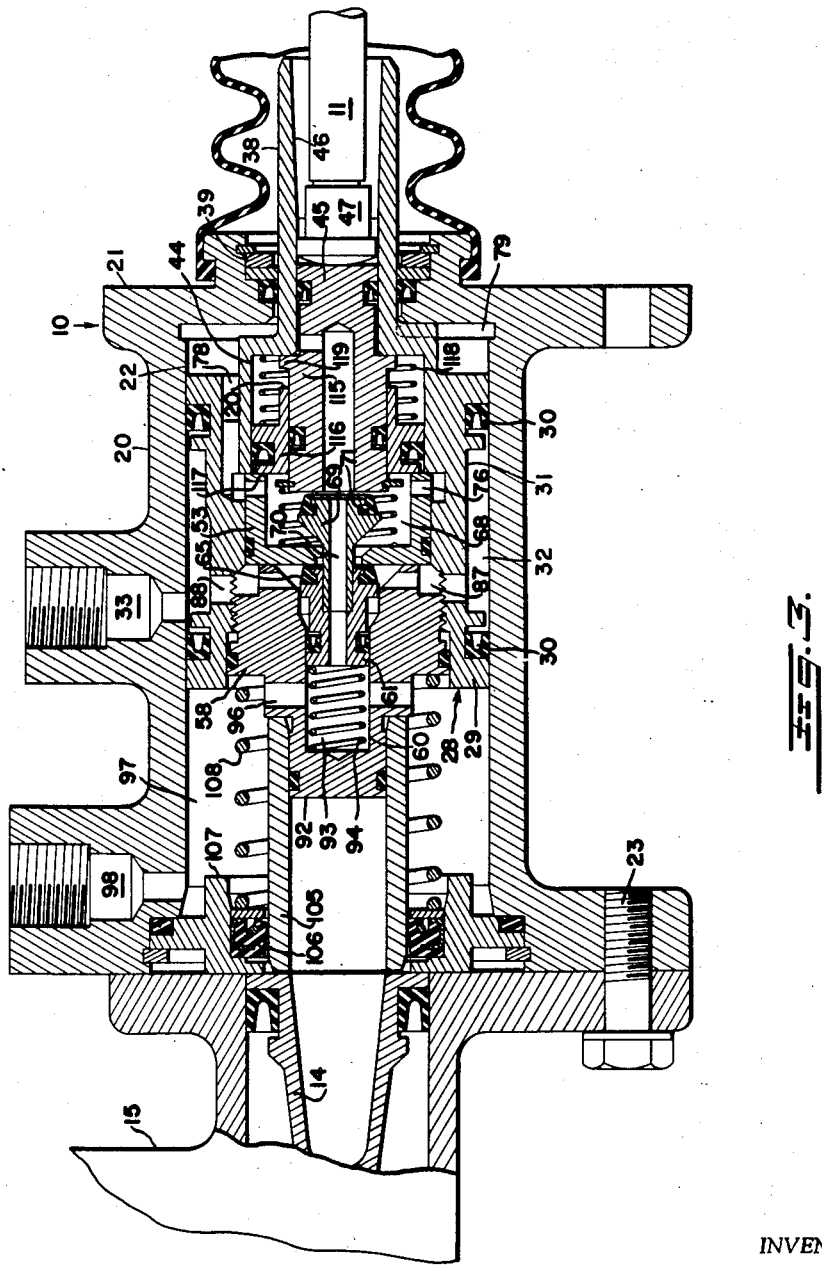
Figure 3 is a similar axial sectional view through a modified form of motor mechanism wherein two stages of hydraulic reaction are provided, the parts being shown in normal off positions.

In the form of the invention previously described, as will be apparent below, the member 43 constitutes a single reaction member subject during operation of the motor to transmit reaction forces from the chamber 68 to the push rod 11 and thus to the pedal 12. In the form of the invention shown in Figures 3 and 4, means are employed for providing the brake pedal with two stages of hydraulic reaction, the first stage during initial brake operation being relatively light and the reaction becoming heavier in later stages of brake actuation. Except for the reaction means, the structure shown in Figures 3 and 4 is substantially identical with the form previously described, and where the same parts are used in the modified form of the invention, they have been indicated by the same reference numerals.

In the form of the invention previously described, it will be noted that the valve operating and reaction member 43 is slidable in the bore 44. In Figures 3 and 4, a different reaction member 115 is employed which is substantially smaller in diameter than the bore 44. The annular space between the reaction member 115 and bore 44 is filled by an annular axially slidable member 116 constituting the element for providing the second stage of reaction. The member 116 normally seats against a shoulder 117 formed on the valve seat member 53 and is biased to such position by a spring 118. The reaction member 115 is provided at its right-hand end with an annular flange 119 normally spaced from the adjacent end 120 of the reaction member 116. The flange 119 and end 120 remain in spaced relation except when pressure in the chamber 68 increases to a predetermined point as referred to below.

*Operation*

The operation of the form of the apparatus shown in Figures 1 and 2 is as follows. The parts normally occupy the positions shown in Figure 1, the valve 65 being closed and the valve 71 being open. The pressure source 34 communicates through port 33 with the chamber 32 and through port 88, chamber 87 and port 86 with the chamber 84. As previously stated, the flange 62 fits loosely in its bore 63, hence the chamber 84 includes the spaces to the left and to the right of the flange 62. The chamber 68 will be closed to pressure in the source since the inlet valve 65 will be closed. The motor chamber 79 will be at atmospheric pressure since it communicates with the sump 100 through passage 78, port 76, chamber 68, passage 70 (the valve 71 being open), chamber 93, ports 96, chamber 97, port 98 and fluid line 99.

When the mechanism is to be operated, the pedal 12 is depressed at its lower end to move the push rod 11 to the left, and similar movement will be transmitted to the member 43 to move its left-hand face into engagement with the valve 71. At this point the valves will be in lap position, both valves being closed and the passage 70, which is at atmospheric pressure, will be disconnected from the chamber 68. Upon further movement of the pedal, the engagement of the member 43 with the valve 71 will move the valve bodies 61 and 69 to the left to open the valve 65, thus connecting the chamber 84 to the chamber 68 for the flow of pressure fluid through ports 76 and passage 78 into the motor chamber 79. The piston unit will then move to the left since pressure will be present in the chamber 79 while the chamber 97 is always substantially at atmospheric pressure. Thus the parts will assume, for example, the positions shown in Figure 2.

The operation of the piston unit 28 in the manner described transmits force to the master cylinder piston 14 to displace fluid through brake lines 16 into the brake cylinders 17 to apply the brakes. In early stages of brake operation, most of the force applied to the master cylinder piston 14 will be the result of pressure admitted into the chamber 79, only slight force being transmitted by the brake pedal through the spring 74. This spring, incidentally, causes the only initial resistance to movement of the brake pedal from its normal off position, thus providing a "soft" pedal.

Immediately upon the admission of pressure fluid into chamber 68, however, the left-hand end of the member 43 will be subjected to hydraulic pressure and this will be transmitted through the push rod 11 to the pedal 12. Thus a direct hydraulic reaction is provided and this reaction increases as pressure in the chamber 68 increases. The continued application of force by the operator will move the member 43 into engagement with the adjacent end of the seat member 53, after which the member 43 will move as a unit with the piston body 29, member 53 and plug 58. The hydraulic reaction, however, will continue to be exerted against the member 43.

Beyond the point at which the member 43 comes into engagement with the seat member 53 the operator will exert direct axial pedal-applied forces to the piston unit to assist pressure in the chamber 79 in applying the brakes up to the point of maximum brake application.

When the brakes are to be released, the operator will release the brake pedal 12, whereupon the member 43 will be immediately moved by a spring 74 to its normal off position, opening the valve 71. The spring 94 will return the valve bodies 61 and 69 to their normal positions shown in Figure 1, return movement of the two valve bodies closing the valve 65 but leaving open the valve 71 as stated. Therefore, the chamber 68 will be cut off from communication with the accumulator 34. The valve 71 being open, pressure in the motor chamber 79 will be relieved through passage 78, port 76, chamber 68, passage 70, and ports 96, the hydraulic fluid being free to flow into the chamber 97 and thence back to the sump through port 98 and line 99. When the valve mechanism is returned to its normal condition shown in Figure 1 after the piston unit has moved, for example, to the position shown in Figure 2, the return spring 108 is free to return the piston unit to its normal off position, the accumulated fluid in the pressure chamber 79 being displaced by the spring 108 through the various passage means referred to.

Attention is invited to the fact that the lines of contact of the valves 65 and 71 with their valve seats are circles of equal diameter, and such diameter is equal to the diameter of the bore 60. With the valve 65 closed as in Figure 1, the area of the valve and its body 62 exposed to pressures in opposite ends of the chamber 84 around the flange 62 will be equal, and accordingly there will be no pressure present biasing the valve 65 into engagement with its seat. The valve structure in the chamber 68 will be subjected to atmospheric pressure. Hence, when the pedal 12 is operated, the only force required for the operation of the valve mechanism, aside from negligible friction, is the force necessary to move the member 43 against the spring 74 and to move the valve body 62 against the spring 94.

When the valves are in the operative positions shown in Figure 2, the area inwardly of the line of contact of the valve 71 with the member 43 is open to atmospheric pressure in the passage 70. There will be a larger area back of the conical head of the valve body 69 exposed to high pressure in the chamber 68 than the area of the valve 71 outwardly of its line of contact. The excess pressure in the chamber 68 tending to seat the valve 71, however, is overcome by the fact that the area of the valve 65 and its flange 62 in the right-hand end of the chamber 84 exceeds the area of the left side of the flange 62 open to pressure in the left-hand end of the chamber 84. Therefore, when the valve mechanism is operative as in Figure 2, as well as when it is inoperative as in Figure 1, the valves are pressure-balanced.

The operation of the form of the mechanism shown in Figures 3 and 4 is identical with that described above except for the fact that two stages of hydraulic reaction are provided. The pedal (not shown in Figure 3) is operated to move the rod 11 to the left to engage the member 115 with the valve 71, whereupon the valve 65 will be moved to open position as in Figure 4. Pressure fluid will be admitted into the chamber 79 as before to move the piston unit toward the left, and the brakes will be applied as described above. The area of the member 115 exposed to pressure in the chamber 67 being substantially smaller than the area of the member 43 (Figure 2) exposed to pressure in the chamber 68, a lower ratio of hydraulic reaction will be transmitted to the brake pedal in initial stages of brake application.

Referring to Figure 3, it will be noted that the flange 119 is substantially spaced from the end 120 of the reaction sleeve 116. When the valves are operated to energize the motor, the flange 119 is moved closer to the end 120 as shown in Figure 4, the left-hand end of the reaction sleeve 116 remaining in contact with the shoulder 117 by the biasing action of the spring 118. When pressure in the chamber 68 is raised to a predetermined point, which point will be reached when master cylinder pressures increase to a predetermined point, the pressure in the chamber 68 will move the reaction sleeve 116 against the loading of the spring 118, thus bringing the end 120 into positive engagement with the flange 119. The combined left-hand areas of the members 115 and 116, minus the area of the member 115 closed by the valve 71, will now be effective for transmitting a hydraulic reaction to the brake pedal. Thus in earlier stages of brake operation, a relatively low ratio of hydraulic reaction is transmitted to the brake pedal, and in later stages of brake operation, the reaction ratio is substantially increased, as will be apparent. The transition from the first stage of reaction to the second stage takes place relatively smoothly. In the first stage of reaction, the reaction forces transmitted to the brake pedal will increase as pressure in the chamber 68 increases, whereupon the reaction member 116 comes into operation quite smoothly and it of course transmits increased reaction as pressures in the chamber 68 continue to increase up to the point of maximum motor energization.

It will be apparent that during the second stage of reaction, the left-hand end of the reaction member 116 will move away from the shoulder 117. If increased pedal pressures are applied after the motor reaches the point of maximum energization, however, the members 115 and 116 will be moved as a unit until the member 116 again engages the shoulder 117. Beyond this point, any increases in brake application will depend upon increased application of force to the brake pedal. This is true, of course, also in the form of the invention shown in Figures 1 and 2, the reaction member 43 being engaged with the adjacent end of the member 53 after maximum motor energization is reached, as described above.

Both forms of the invention are capable solely of pedal actuation in the event of a failure of power in the source. Forces will be transmitted axially through the motors in the same manner as described above in connection with the engagement of the reaction members with the member 53 after either motor has been energized to its maximum extent.

As distinguished from the copending application of William Stelzer, Serial No. 652,433, referred to above, the present construction eliminates the necessity for the use of a hose connected at one end to and movable with the piston unit to return fluid to the sump employed in a closed hydraulic system such as the one with which the present invention is utilized. The chamber 97 is employed as the return chamber for the fluid, thus permitting the use of fixed ports 33 and 98 extending through the body of the motor. The valve mechanism is substantially simplified and rendered quite economical to manufacture. This is due partly to the use of the rubber or similar valves 65 and 71 and is due also to the mounting and assembly of the various elements. For example, in the assembly of the piston unit, the member 43 in Figures 1 and 2 is inserted into the bore 44. The valve body 61 is inserted in its bore, the seat member 53 is placed in position against the member 58, and the valve body 69 is placed in the interior of the member 53 with its shank portion moved axially into position relative to the valve body 61. The unit thus assembled is inserted into the piston unit, whereupon the plug member 58 is screwed up into position as shown. Moreover, the arrangement is such that there is no metal-to-metal contact depended upon for sealing valves, and accordingly no accuracy is required in the formation of the right-hand ends of the two valve bodies relative to their seats. Therefore the structure is economical to manufacture and assemble.

Attention is invited to the fact that the valve unit is movable a substantial distance to the left of the normal off positions shown in Figure 1. This distance of movement is greater than the distance between the valve operating member 43 and the adjacent end of the seat member 53. Therefore, when play is taken up between the members 43 and 53, no further pedal forces can be applied to the valve unit and such unit accordingly cannot be moved to its limit of movement and the rubber valve elements are protected against the application of undue pressures.

It also will be noted that all forces of every kind transmitted through the apparatus are coaxial. Thus all lateral and angular forces are eliminated and friction is reduced to a minimum by eliminating any tendency for any of the parts to bind.

It is to be understood that the forms of the invention shown and described are to be taken as preferred examples of the same and that various changes in the

I claim:

1. A hydraulic motor comprising a cylinder, a piston unit in said cylinder having a pressure chamber at one end thereof, said piston unit comprising a valve seat member therein having a wall perpendicular to the axis of said piston unit and forming on opposite sides thereof a pair of hydraulic chambers one of which communicates with said pressure chamber and the other of which communicates with a source of hydraulic fluid under pressure, a valve unit in said piston unit comprising a pair of valves one of which is an exhaust valve arranged in said one chamber and the other of which is an inlet valve arranged in said other chamber and normally engaging said wall to disconnect said chambers, said exhaust valve being normally open, a pressure responsive valve actuating member arranged in said piston unit and having one end forming the end of said one chamber remote from said wall, said end of said valve actuating member being normally disengaged from said exhaust valve, and an operating element engageable with said valve actuating member to move the latter into engagement with said exhaust valve to close the latter and to then effect movement of said valve unit to open said inlet valve to connect the chambers of said pair and admit hydraulic pressure into said pressure chamber, said end of said valve actuating member being exposed to pressure in said one chamber to react against said operating element and oppose movement thereof in accordance with pressure in said one chamber.

2. A motor according to claim 1 wherein said piston unit is provided therein with a shoulder engageable by said valve actuating member to limit movement of the latter relative to said piston unit after said inlet valve has been opened, whereby direct forces may be transmitted from said valve operating element through said actuating member to said piston unit.

3. A motor according to claim 1 wherein the other end of said cylinder comprises an outlet chamber, said valves being annular and coaxial with said piston unit and said valve unit having an axial passage therethrough communicating at one end with said outlet chamber and at its other end with the space within said exhaust valve.

4. A motor according to claim 1 wherein the other end of said cylinder comprises an outlet chamber, said valves being annular and coaxial with said piston unit and said valve unit having an axial passage therethrough communicating at one end with said outlet chamber and at its other end with the space within said exhaust valve, said piston unit having an axial bore therein equal in diameter to said valves, the end of said valve unit opposite said exhaust valve having a portion slidable in said bore in sealed relation thereto, and a spring in said bore engaging the adjacent end of said valve unit to bias the latter to a normal position with said exhaust valve open and said inlet valve closed.

5. A hydraulic motor comprising a cylinder, a piston unit in said cylinder having an elongated annular groove in its periphery, said piston unit having sealed sliding engagement with the interior of said cylinder at points spaced beyond the ends of said groove, said cylinder having an inlet port communicating with said annular groove to supply pressure fluid thereto in any position of said piston unit, said piston unit being hollow and comprising a valve seat member therein including a valve seat wall perpendicular to the axis of said piston unit and forming on opposite sides thereof a pair of chambers, one end of said cylinder having a pressure chamber communicating with one chamber of said pair and the other chamber of said pair communicating with said annular groove, a valve unit in said piston unit comprising a pair of valves bodily axially movable, one of said valves being an exhaust valve arranged in said one chamber and the other valve being an inlet valve normally engaging said perpendicular wall to seal the chambers of said pair from each other, and an axially movable valve actuating member in said piston unit forming a seat for said exhaust valve and normally disengaged therefrom, movement of said valve operating member in one direction engaging said exhaust valve to close said one chamber from exhaust and to transmit movement to the other valve to open it and connect the chambers of said pair to each other to supply pressure fluid to said pressure chamber.

6. A motor according to claim 5 wherein said valve actuating member comprises a plunger having an inner face forming a valve seat for said exhaust valve and exposed to pressure in said one chamber to resist movement of said valve actuating member in accordance with pressure in said one chamber.

7. A motor according to claim 5 wherein said valve actuating member comprises a plunger having an inner face forming a valve seat for said exhaust valve and exposed to pressure in said one chamber to resist movement of said valve actuating member in accordance with pressure in said one chamber, said valves being resilient and said valve unit being movable at least a predetermined distance for the closing of said exhaust valve and the opening of said inlet valve, and means carried by said piston unit and engageable with said plunger to limit movement of said plunger with respect to said piston unit a distance less than said predetermined distance to prevent the application of undue force to said valves and to transmit forces directly from said plunger to said piston unit.

8. A motor according to claim 5 wherein said valves are annular and of equal diameter, said piston unit having a bore equal in diameter to said valves, said valve unit having its end opposite said exhaust valve slidable in sealed relation in said bore, said valve unit having an axial passage therethrough one end of which is open to exhaust and the other end of which opens into the space within said annular exhaust valve.

9. A motor according to claim 5 wherein the other end of said cylinder forms an outlet chamber, said valves being annular and said valve unit having an axial passage therethrough communicating at one end with said outlet chamber and at its other end with the space within said exhaust valve, and a spring engaging said valve unit and biasing said valves to normal positions with said inlet valve closed, and a spring biasing said valve actuating member to a normal position with said end thereof spaced from said exhaust valve.

10. A hydraulic motor comprising a cylinder, a piston unit therein dividing said cylinder to form a pressure chamber in one end and an outlet chamber in the other end, said piston unit being hollow, a valve seat unit in said piston unit having a cylindrical portion and a wall perpendicular to the axis of said piston unit and having an axial opening therethrough, a plug unit threaded into said piston unit and engaging said seat unit to maintain the latter in position, said plug member having an axial space, said wall of said seat unit dividing said space from the space within said annular portion of said seat unit for forming a pair of chambers one of which communicates with said pressure chamber and the other of which communicates with a source of hydraulic pressure, a valve unit within said piston unit having an exhaust valve within said one chamber, and an inlet valve in said other chamber engageable with said perpendicular wall to normally seal the chambers of said pair from each other, a spring engaging said valve unit to bias said inlet valve to closed position, a valve actuating member axially movable in said piston unit and having an end normally spaced from and forming a seat for said exhaust valve, said valves being annular and coaxial with said piston unit, said valve unit having an axial passage therethrough communicating at one end with the space within said exhaust valve and at its other end with said outlet chamber, a spring in said one chamber engaging at opposite ends against said perpendicular wall and against said valve actuating member, and an axial valve operating element engageable with said valve actuating member to move the latter to engage and close said exhaust valve to close said one chamber to said axial passage and to transmit movement to said inlet valve to open the chambers of said pair to each other to supply pressure fluid to said pressure chamber.

11. A motor according to claim 10 wherein said valve actuating member comprises a plunger in sliding sealed engagement with said piston unit and having its face engageable with said exhaust valve exposed to pressure in said one chamber whereby its movement to operate said valves is opposed by pressure in said one chamber.

12. A motor according to claim 10 wherein said valves are annular and of the same diameter, said plug member having a bore of the same diameter as said valves coaxial therewith, the end of said valve unit opposite said exhaust valve being slidable in said bore in sealed relation therewith.

13. A motor according to claim 10 wherein said valve actuating member comprises a plunger, a reaction sleeve having one end exposed to pressure in said one chamber, said piston unit having a coaxial bore in which said reaction sleeve is slidable, said plunger being slidable in said reaction sleeve and having its end adjacent said exhaust valve exposed to pressure in said one chamber to oppose movement of said plunger in a valve operating direction in accordance with pressures in said one chamber, a spring biasing said reaction sleeve in said direction, and means on said plunger and said reaction sleeve comprising normally spaced abutment shoulders engageable with each other when pressure in said one chamber increases to a predetermined point to move said reaction sleeve in the other direction, to further oppose movement of said plunger.

References Cited in the file of this patent

UNITED STATES PATENTS

| 2,410,269 | Chouings | Oct. 29, 1946 |
| 2,503,827 | Langmore et al. | Apr. 11, 1950 |
| 2,775,957 | Anderson | Jan. 1, 1957 |

FOREIGN PATENTS

| 424,653 | Italy | Mar. 22, 1944 |